(12) United States Patent
Heckman

(10) Patent No.: US 6,449,865 B1
(45) Date of Patent: Sep. 17, 2002

(54) DIPSTICK GUIDE

(75) Inventor: Thad Heckman, 1 Wagon Wheel Rd., Carbondale, IL (US) 62901

(73) Assignee: Thad Heckman, Carbondale, IL (US)

( * ) Notice: Subject to any disclaimer, the term of this patent is extended or adjusted under 35 U.S.C. 154(b) by 0 days.

(21) Appl. No.: 09/379,518

(22) Filed: Aug. 23, 1999

(51) Int. Cl.[7] .............................................. G01F 23/04
(52) U.S. Cl. .................................................... 33/726
(58) Field of Search ........................ 33/726, 721, 722, 33/730, 731

(56) References Cited

U.S. PATENT DOCUMENTS

| | | | | |
|---|---|---|---|---|
| 4,155,167 A | * | 5/1979 | DeLano | 33/726 |
| 4,510,690 A | * | 4/1985 | Attler | 33/726 |
| 4,780,925 A | * | 11/1988 | Sherman | 33/726 |
| 4,894,926 A | * | 1/1990 | Suhr | 33/726 |
| 5,042,167 A | * | 8/1991 | Link | 33/726 |
| 5,241,753 A | * | 9/1993 | Lalevee, Sr. | 33/726 |
| 5,829,153 A | * | 11/1998 | Hitchcock | 33/722 |

* cited by examiner

Primary Examiner—Christopher W. Fulton
(74) Attorney, Agent, or Firm—Harness, Dickey & Pierce, P.L.C.

(57) ABSTRACT

A guide adapted to be installed on a diptube to faciliate locating and inserting and removing a dipstick from the diptube comprises a compressible stem section adapted to be secured over proximal end portion of a diptube, and a cup section adjacent the stem section which surrounds the proximal end of the diptube when the stem is secured thereon. The guide preferably has a longitudinal slot in the stem and cup, allowing the guide to be friction fit on the proximal end portion of the diptube or compressed around the proximal end portion of a dip tube. The guide is secured with a clamp that compresses the stem around the diptube, or the guide may have an integral clamp that compresses the stem around the diptube. The guide is preferably made from a molded, brightly colored plastic.

12 Claims, 2 Drawing Sheets

DIPSTICK GUIDE

FIELD OF THE INVENTION

This invention relates to dipsticks and diptubes for engines and drive trains, and particularly for engines and drive trains in motor vehicles.

BACKGROUND OF THE INVENTION

The engines and drive trains in motor vehicles are often provided with diptubes into which a dipstick can be inserted to measure fluid levels. For example, a typical vehicle engine and power train might have a diptube for measuring the level of engine oil and a diptube for measuring the level of transmission fluid. With the myriad of different vehicles, and the increasing complexity of the engines, it can be difficult to locate the appropriate dipstick to check a fluid level. Furthermore, once the dipstick is removed to measure the fluid level, it can be even more difficult to find the diptube to replace the dipstick. Even if the diptube is found, it can be difficult to manipulate the end of the flexible dipstick into the end of the diptube.

SUMMARY OF THE INVENTION

The present invention relates to a guide adapted to be installed on the proximal end of a diptube, to facilitate locating the diptube and inserting a dipstick into the diptube. Generally, the dipstick guide of the present invention is adapted to fit on the proximal end of the diptube. The guide preferably has a stem that fits over the proximal end portion of the diptube for securing the dipstick guide on the proximal end portion of the diptube, and a cup section generally surrounding the proximal end of the diptube. A rim projects from the cup generally upwardly and outwardly to catch the distal end of the dipstick, and provide a stable edge on which the dipstick can be rested to facilitate its insertion into the proximal end of the diptube. There is a longitudinal slot extending through at least the stem section, and preferably through the entire dipstick guide which allows the guide to be circumferentially compressed over the distal end portion of a diptube, to secure it. The guide is preferably brightly colored, and more preferably is made from molded plastic.

The dipstick guide of the present invention is thus of simple, and inexpensive construction. It can be easily retrofit to the dipstick tubes on existing vehicles and/or incorporated into new vehicles. The guide makes it easy to locate the diptube to check the fluid levels, and makes it easy to replace the dipstick after it has been removed to check the fluid level. By making it easier to check the fluid levels, the guide makes it more likely that the engine and drive train will be properly monitored and serviced. These and other features and advantages will be in part apparent and in part pointed out hereinafter.

BRIEF DESCRIPTION OF THE DRAWINGS

Corresponding reference numerals indicate corresponding parts throughout the several views of the drawings.

DETAILED DESCRIPTION OF THE INVENTION

Figure 1:
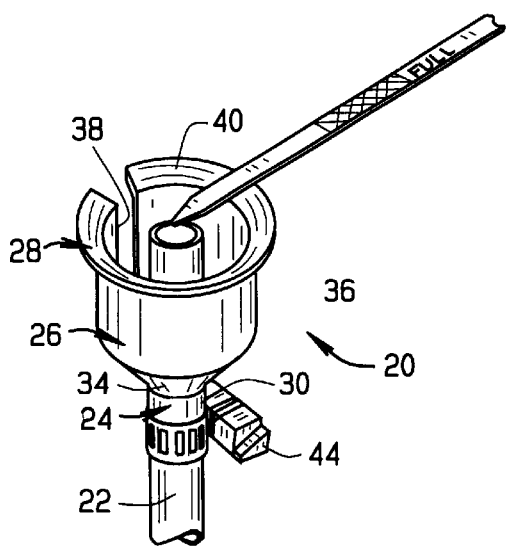
FIG. 1 is a perspective view of a dipstick guide constructed according to the principles of this invention, shown as it would be attached to the proximal end of a diptube.
Figure 2:
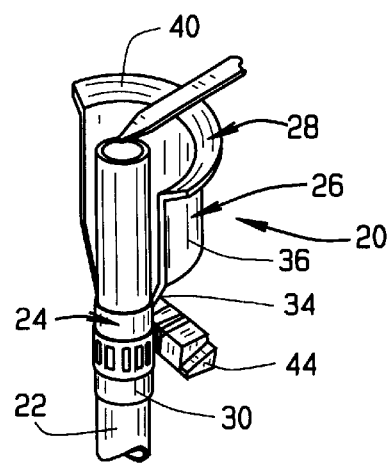
FIG. 2 is a perspective view of a dipstick guide shown in FIG. 1, with a portion broken away to show the attachment to the proximal end of the diptube.
Figure 3:
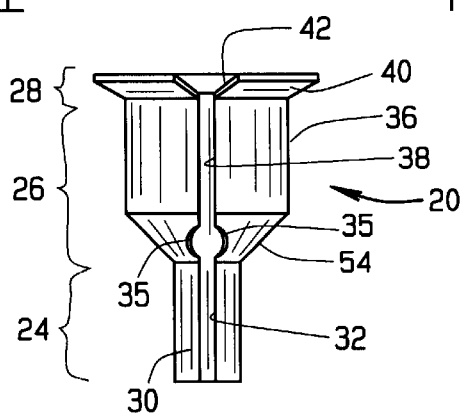
FIG. 3 is a front elevation view of the dipstick guide.
Figure 4:
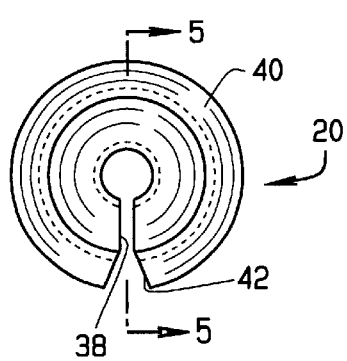
FIG. 4 is a top plan view of the dipstick guide.
Figure 5:
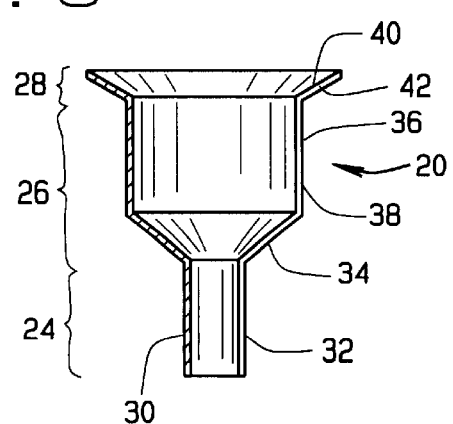
FIG. 5 is a vertical cross-sectional view of the dipstick guide taken along the plane of line 5—5 in FIG. 4.

A first embodiment of a dipstick guide constructed according to the principles of this invention, indicated generally as 20, is shown in FIG. 1 as it would be attached to the proximal end of a diptube 22, such as the diptube of an engine crankcase. As shown in the Figures, the dipstick guide 20 comprises a stem 24, a cup 26, and a rim 28. The stem 24 has a generally cylindrical sidewall 30 with a longitudinally extending slot 32 so that the stem can be compressed around the proximal end portion of the diptube 22. The cup 26 comprises a generally frustoconical bottom 34 adjacent the stem 24, and a generally cylindrical sidewall 36. A longitudinally extending slot 38 extends through the frustoconical bottom 34 and the sidewall 36, aligned with the slot 32 in the stem 24, to facilitate the compression of the guide 20 around the proximal end of the diptube. There are arcuate cutouts 35 in the frustoconical bottom 34, adjacent the slot 38, to facilitate the flexing of the guide as it is urged over the proximal end of the diptube.

The rim 28 comprises a generally funnel-shaped wall 40 sloping upwardly and outwardly from the top edge of the cylindrical sidewall 36 of the cup 26. A longitudinally extending slot 42 extends through the rim 40, aligned with the slot 38 in the cup 26 and with the slot 32 in the stem 24. The aligned slots 32, 38, and 42 allow the guide 20 to be friction fit over the distal end portion of the diptube 24, or if necessary, circumferentially compressed around the proximal end portion of the diptube 22.

The guide 20 is preferably made from molded plastic, such as polypropylene. The plastic is preferably brightly colored to facilitate locating the diptube in a crowded, dark and dirty engine compartment. The plastic is preferably sufficiently resilient to allow the stem section 24 to be friction fit over the proximal end portion of the diptube, or if necessary, compressed around the proximal portion of the diptube 22 and secured, for example, with a conventional hose clamp 44 or any other suitable device for compressing the stem around the distal end portion of the diptube 22.

Figure 6:
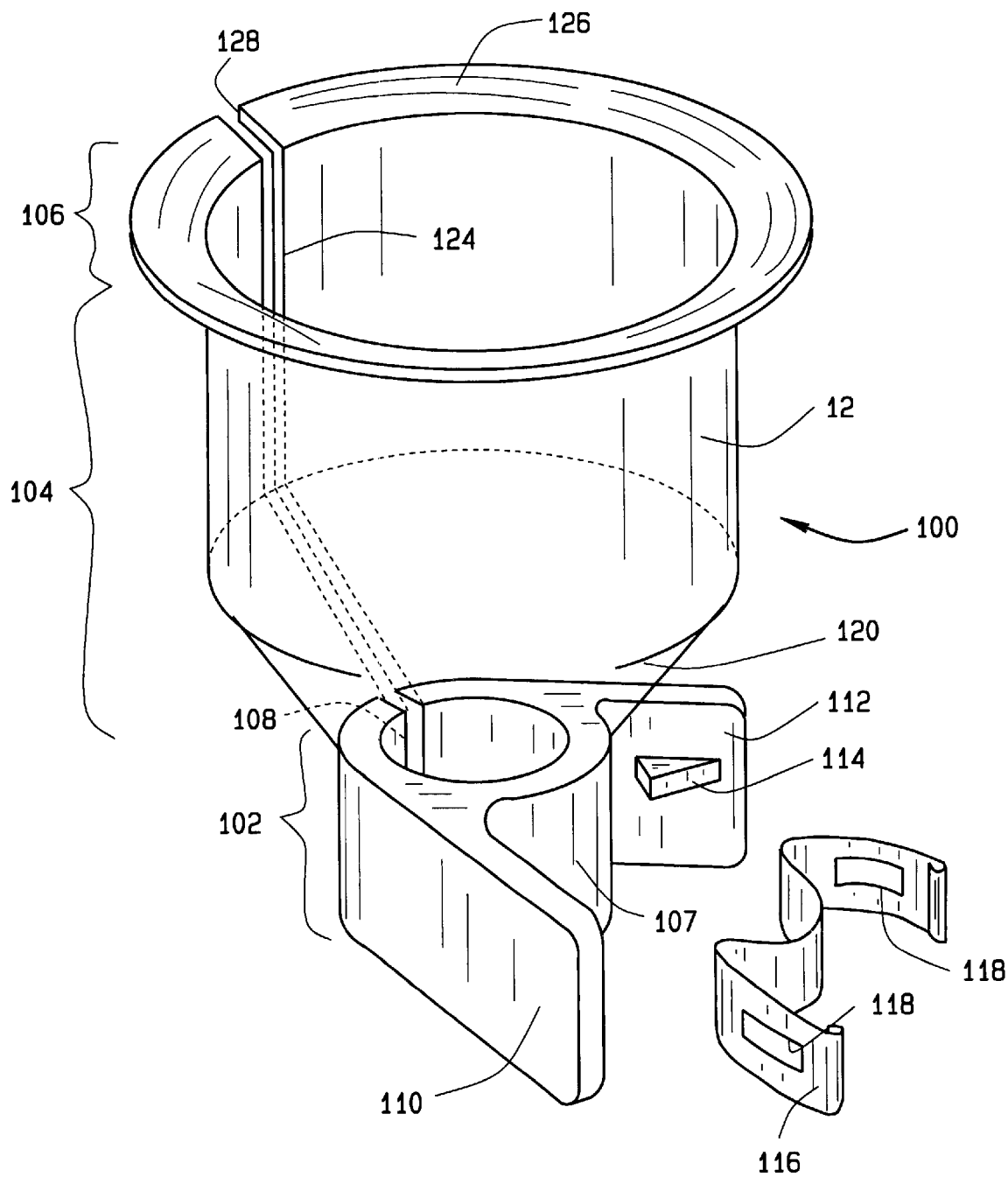
FIG. 6 is a perspective view of a second embodiment of a dipstick guide constructed according to the principles of this invention.

A second embodiment of a dipstick guide constructed according to the principles of this invention is indicated generally as 100 in FIG. 6. As shown in FIG. 6, the dipstick guide 100 comprises a stem 102, a cup 104, and a rim 106. The stem 102 has a generally cylindrical sidewall 107 with a longitudinally extending slot 108 so that the stem can be circumferentially compressed around the proximal end portion of a diptube. Wings 110 and 112 extend from the sidewall 107 of the stem 102. A boss 114 projects from the surface of each wing 110 and 112. A spring clip 116, is adapted to fit between the wings 110 and 112 to resiliently bias the wings 110 and 112 apart to compress the stem 102 around the proximal end portion of the diptube. The spring clip 116 has openings 118 for receiving the bosses 114, to secure the spring clip 116 to the wings 110 and 112. Of course a coil spring or some other device can be provided instead of spring clip 116 to resiliently bias the wings 110 and 112 apart to secure the stem 102 on the proximal end portion of a diptube.

The cup 104 comprises a generally frustoconical bottom 120 adjacent the stem 102, and a generally cylindrical sidewall 122. A longitudinally extending slot 124 extends through the frustoconical bottom 120 and the sidewall 122, aligned with the slot 108 in the stem 102.

The rim 106 comprises a generally funnel-shaped sidewall 126 sloping upwardly and outwardly from the top edge of the sidewall 122 of the cup 104. A longitudinally extending slot 128 extends through the sidewall 126 of the rim, aligned with the slot 124 in the cup 104 and with the slot 108 in the stem 102. The aligned slots 108, 124 and 128 allow the guide 100 to be circumferentially compressed around the distal end portion of the diptube.

The guide 20 is preferably made from molded plastic, such as polypropylene. The plastic is preferably brightly colored to facilitate locating the diptube in a crowded, dark and dirty engine compartment. The plastic is preferably sufficiently resilient to allow the stem section 102 to be friction fit around the proximal end portion of diptube, or if necessary, compressed around the proximal portion of the diptube and secured, for example with the spring clip 116.

OPERATION

In operation the guide 20 is secured on the proximal end of a dip tube by placing the stem section 24 over the proximal end portion of the dip tube. The guide 20 is secured with a clamp 42, with the end of the diptube generally level with the upper edge of the rim 40. The guide 20 clearly identifies the diptube, making it easy to find the dipstick to check the fluid level. After the fluid level has been checked, the guide 20 makes it easy to find the diptube to reinsert the dipstick. The edge of the rim 40 also helps stabilize the distal end of the flexible dipstick, to make it easier to insert the dipstick into the diptube. Furthermore, if the end of the dipstick misses the diptube, it is promptly caught in the cup, alerting the user to retry inserting the dipstick into the diptube.

In operation the guide 100 is secured on the proximal end of a diptube by placing the stem section 102 over the proximal end portion of the dip tube. The wings 110 and 112 are squeezed to loosen the stem section so that it can be fit over the proximal end of the diptube, and once in position the wings are released, and due to the resilience of the spring clip 116, the stem section tightly grips the exterior of the diptube. The guide 100 is preferably secured so that the end of the diptube is generally level with the upper edge of the rim 126. The guide 100 clearly identifies the diptube, making it easy to find the dipstick to check the fluid level. After the fluid level has been checked, the guide 100 makes it easy to find the diptube to reinsert the dipstick. The edge of the rim 126 also helps stabilize the distal end of the flexible dipstick, to make it easier to insert the dipstick into the diptube. Furthermore, if the end of the dipstick misses the diptube, it is promptly caught in the cup, alerting the user to retry inserting the dipstick into the diptube.

What is claimed is:

1. In an engine of the type having a diptube having a proximal end into which a dipstick can be inserted to measure an engine fluid level, a guide attached to the proximal end of the diptube, the guide comprising a compressible stem adapted to fit over the proximal end portion of the diptube; a cup adjacent the stem, surrounding the proximal end of the diptube; and a flared rim projecting upwardly and outwardly from the cup; the stem, cup, and rim having a slot therein and arcuate cut-outs in the cup adjacent the slot permitting the guide to be circumferentially compressed around the proximal end portion of the diptube.

2. The combination according to claim 1 further comprising a clamp for compressing the stem around the proximal portion of the diptube.

3. The combination according to claim 2 wherein the clamp is formed integrally with the stem.

4. The combination according to claim 3 wherein the clamp comprises first and second wings projecting from the stem and a spring resiliently biasing the wings to compress the stem.

5. The combination according to claim 1 wherein the guide is brightly colored.

6. The combination according to claim 1 wherein the guide is made from plastic.

7. In a motor vehicle of the type having an engine and drive train with a diptube having proximal end into which a dipstick can be inserted to measure and engine fluid level, a guide attached to the proximal end of the diptube, the guide being made of a brightly colored plastic to identify the location of the end of the diptube and having a compressible stem section secured over the proximal end portion of the diptube, and a cup section adjacent the stem section surrounding the proximal end of the diptube, the stem and cup having a continuous slot therein and arcuate cut-outs in the cup adjacent the slot permitting the guide to be circumferentially compressed around the proximal end portion of the diptube.

8. The combination according to claim 7 further comprising a clamp compressing the compressible stem around the diptube.

9. The combination according to claim 7 wherein the guide further comprises an integral clamp, the clamp comprising wings projecting form the stem, and a spring for biasing the wings to compress the compressible stem.

10. A guide adapted to be attached to a diptube having a proximal end into which a dipstick can be inserted to measure an engine fluid level, the guide comprising a compressible stem comprising a generally cylindrical sidewall with an upper edge and a lower edge adapted to fit over the proximal end portion of the tube; a cup adjacent the stem comprising a generally cylindrical sidewall having an upper edge and a lower edge and a frustoconical bottom tapering from the lower edge of the generally cylindrical sidewall of the cup to the upper edge of the generally cylindrical sidewall of the stem, and a rim comprising a generally funnel-shaped wall sloping outward and upwardly from the upper edge of the cylindrical sidewall of the cup, the stem, cup, and rim having a continuous slot therein and arcuate cut-outs in the cup adjacent the slot permitting the guide to be circumferentially compressed around the proximal end portion of the diptube.

11. The guide according to claim 10 further comprising a clamp comprising the compressible stem around the diptube.

12. The guide according to claim 10 further comprising an integral clamp, the clamp comprising wings projecting from the stem, and a spring for biasing the wings to compress the compressible stem.

* * * * *